United States Patent
Digiovanni et al.

(10) Patent No.: US 8,000,570 B2
(45) Date of Patent: Aug. 16, 2011

(54) SEQUENTIALLY INCREASING EFFECTIVE AREA IN HIGHER-ORDER MODE (HOM) SIGNAL PROPAGATION

(75) Inventors: David J Digiovanni, Mountain Lakes, NJ (US); Siddharth Ramachandran, Pittsburgh, PA (US)

(73) Assignee: Furukawa Electric North America, Inc., Norcross, GA (US)

( * ) Notice: Subject to any disclaimer, the term of this patent is extended or adjusted under 35 U.S.C. 154(b) by 225 days.

(21) Appl. No.: 12/523,348

(22) PCT Filed: Feb. 5, 2008

(86) PCT No.: PCT/US2008/053042
§ 371 (c)(1),
(2), (4) Date: Jul. 16, 2009

(87) PCT Pub. No.: WO2008/097963
PCT Pub. Date: Aug. 14, 2008

(65) Prior Publication Data
US 2010/0034500 A1  Feb. 11, 2010

Related U.S. Application Data

(60) Provisional application No. 60/888,114, filed on Feb. 5, 2007.

(51) Int. Cl.
*G02B 6/26* (2006.01)
(52) U.S. Cl. ............... 385/28; 385/27; 385/31
(58) Field of Classification Search ............ 385/25, 385/26, 27, 28, 29, 30, 31, 15, 37, 42
See application file for complete search history.

(56) References Cited

U.S. PATENT DOCUMENTS

| | | | |
|---|---|---|---|
| 6,360,045 B1 * | 3/2002 | Shoval et al. | 385/123 |
| 6,404,951 B2 * | 6/2002 | Danziger | 385/28 |
| 6,768,835 B2 * | 7/2004 | Ramachandran | 385/28 |
| 2003/0202547 A1 * | 10/2003 | Fermann et al. | 372/6 |
| 2004/0213513 A1 * | 10/2004 | Barros et al. | 385/28 |
| 2005/0013572 A1 * | 1/2005 | Guan et al. | 385/127 |
| 2005/0254763 A1 * | 11/2005 | Provost et al. | 385/123 |
| 2010/0034500 A1 * | 2/2010 | Digiovanni et al. | 385/28 |

* cited by examiner

*Primary Examiner* — Brian Healy
(74) *Attorney, Agent, or Firm* — Michael A. Morra, Esq.; Sam Han, Esq.

(57) ABSTRACT

Disclosed are multi-stage optical amplifiers that propagate higher-order mode (HOM) signals. One embodiment, among others, comprises a first segment of optical fiber in which a first HOM signal propagates, a second segment of optical fiber in which a second HOM signal propagates, and a mode converter that converts the first HOM signal into the second HOM signal.

12 Claims, 7 Drawing Sheets

SEQUENTIALLY INCREASING EFFECTIVE AREA IN HIGHER-ORDER MODE (HOM) SIGNAL PROPAGATION

CROSS REFERENCE TO RELATED APPLICATIONS

This application claims the benefit of U.S. provisional patent application Ser. No. 60/888,114, filed 2007 Feb. 5, having the title "Higher Order Mode Amplifiers," which is incorporated herein by reference in its entirety.

Additionally, the following U.S. patent applications are incorporated by reference herein, as if expressly set forth in their entireties:

(a) U.S. patent application Ser. No. 11/606,718, filed on 2006 Nov. 30, by DiGiovanni et al.;

(b) U.S. patent application Ser. No. 11/230,905, filed on 2005 Sep. 20, by Nicholson et al.;

(c) U.S. patent application Ser. No. 11/105,850, filed on 2005 Apr. 14, by Ramachandran et al.;

(d) U.S. patent application Ser. No. 11/367,495, filed on 2006 Mar. 4, by Ramachandran et al.;

(e) U.S. patent application Ser. No. 11/487,258, filed on 2006 Jul. 14, by Fini et al.

Also, the following U.S. patent applications, which are being filed concurrently, are incorporated by reference herein, as if set forth in their entireties:

(f) U.S. patent application Ser. No. 12/525,332, by Ramachandran and Yablon, having the title "Preventing Dielectric Breakdown in Optical Fibers";

(g) U.S. patent application Ser. No. 12/525,339, by Ramachandran, having the title "Pumping in a Higher-Order Mode that is Different From a Signal Mode";

(h) U.S. patent application Ser. No. 12/525,122, by DiGiovanni, Ghalmi, Mermelstein, and Ramachandran, having the title "Segmented Gain-Doping of an Optical Fiber"; and (i) U.S. patent application Ser. No. 12/525,124, by DiGiovanni and Ramachandran, having the title "Selectively Pumping a Gain-Doped Region of a Higher-Order Mode Optical Fiber"; and U.S. patent application Ser. No. 12/525,138, by DiGiovanni and Headly, having the title "Pumping in a Higher-Order Mode that is Substantially Identical to a Signal Mode."

FIELD OF THE DISCLOSURE

The present disclosure relates generally to optical fibers and, more particularly, to higher-order mode ("HOM") signal transmission in optical fibers.

BACKGROUND

Ever since silica-based optical fibers have been used for high-power lasers and amplifiers, there have been ongoing efforts to increase the power of the signal that is transmitted through the fibers. When transmitting signals through optical fibers, low signal power in a large mode area results in poor energy extraction. Conversely, detrimental effects manifest themselves at extremely high power. Given these and other problems, there exists a need in the industry for a different approach to amplifying signals in optical fibers.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 5($a$) is a diagram showing a cross-section of an example fiber having an 86-micrometer inner cladding.

FIG. 5($b$) is a chart showing the refractive index profile of the fiber in FIG. 5($a$).

FIG. 5($c$) is a diagram showing a near-field image of a HOM signal propagating in the fiber of FIG. 5($a$).

FIG. 5($d$) is a chart comparing the actual signal profile of FIG. 5($c$) with a theoretical signal profile.

DETAILED DESCRIPTION OF THE EMBODIMENTS

Reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

Figure 1:
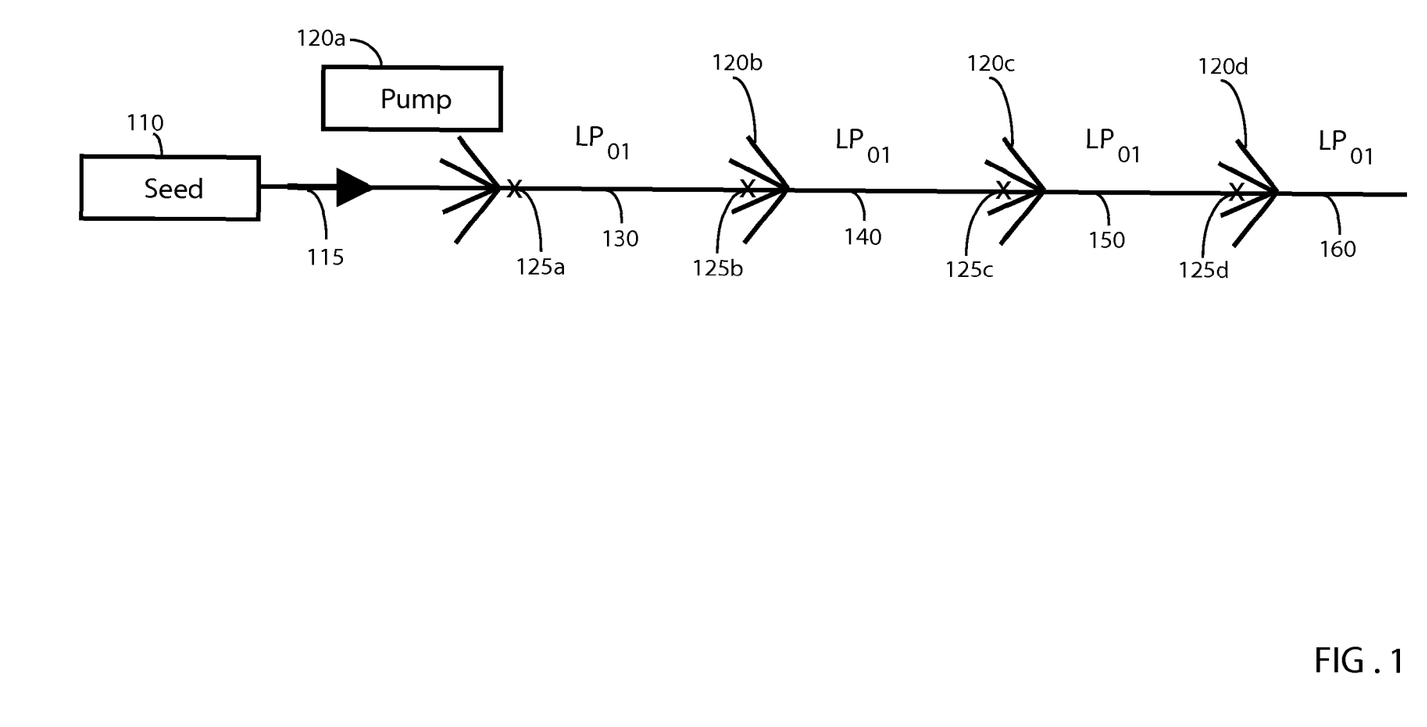
FIG. 1 shows one example of a multi-stage architecture in which a fundamental mode signal is propagated through different types of optical fibers that have been spliced together.

High-power amplifiers have conventionally been constructed using multi-stage architectures, similar to that shown in FIG. 1. The signal 115 propagates through multiple stages as it is amplified from a relatively low-power signal (e.g., nanowatts, microwatts, or milliwatts) to a very high-power signal (e.g., kilowatts). Each of the sequential stages is constructed of a different fiber, with each fiber being configured to accommodate the propagating signal at a particular power level in order to decrease undesired nonlinear effects.

Thus, in operation, the fundamental-mode ($LP_{01}$) incoming signal 115 is injected into a first gain-doped fiber segment 130, which is spliced 125$a$ to the input fiber. Since the first gain-doped fiber segment 130 is in an excited state due to the pump 120$a$, it amplifies the propagating $LP_{01}$ signal. Since that segment 130 is specifically configured for one power level, a different gain-doped fiber segment 140 is spliced 125$b$ to the first segment 130 to accommodate the increasing power level of the $LP_{01}$ signal as it propagates. For some embodiments, the second segment is also pumped 120$b$. As one can see, each of the different segments 130, 140, 150, 160 is configured to match the different power levels of the propagating $LP_{01}$ signal.

One disadvantage of simply propagating the $LP_{01}$ fundamental-mode signal is that there is limited flexibility in how the increasing signal is accommodated. Using higher-order mode (HOM) signals permits greater design flexibility and other advantages, as shown below.

In the various embodiments of the invention, disclosed herein, higher-order mode (HOM) signals are used to accommodate the increasing power levels. In other words, rather than propagating the signal in the fundamental mode through all of the multiple stages, the various embodiments herein teach the sequential propagation of different HOM signals, thereby matching mode area to signal power and, hence, increasing the efficiency of energy extraction.

Figure 2A:
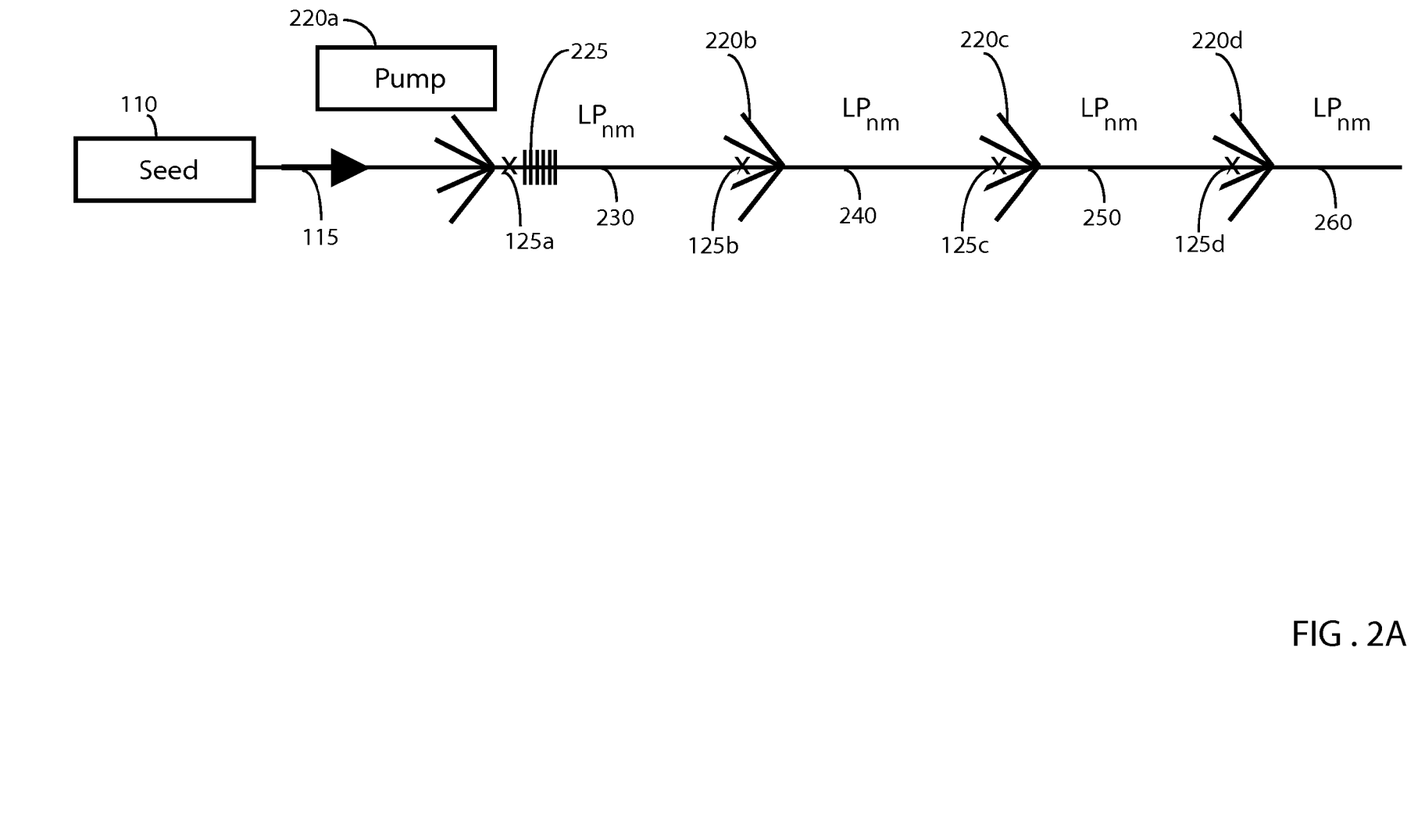
FIGS. 2A through 2C are schematics showing multi-stage architectures in which a propagating signal is converted from one higher-order mode (HOM) to another HOM.
Figure 2B:
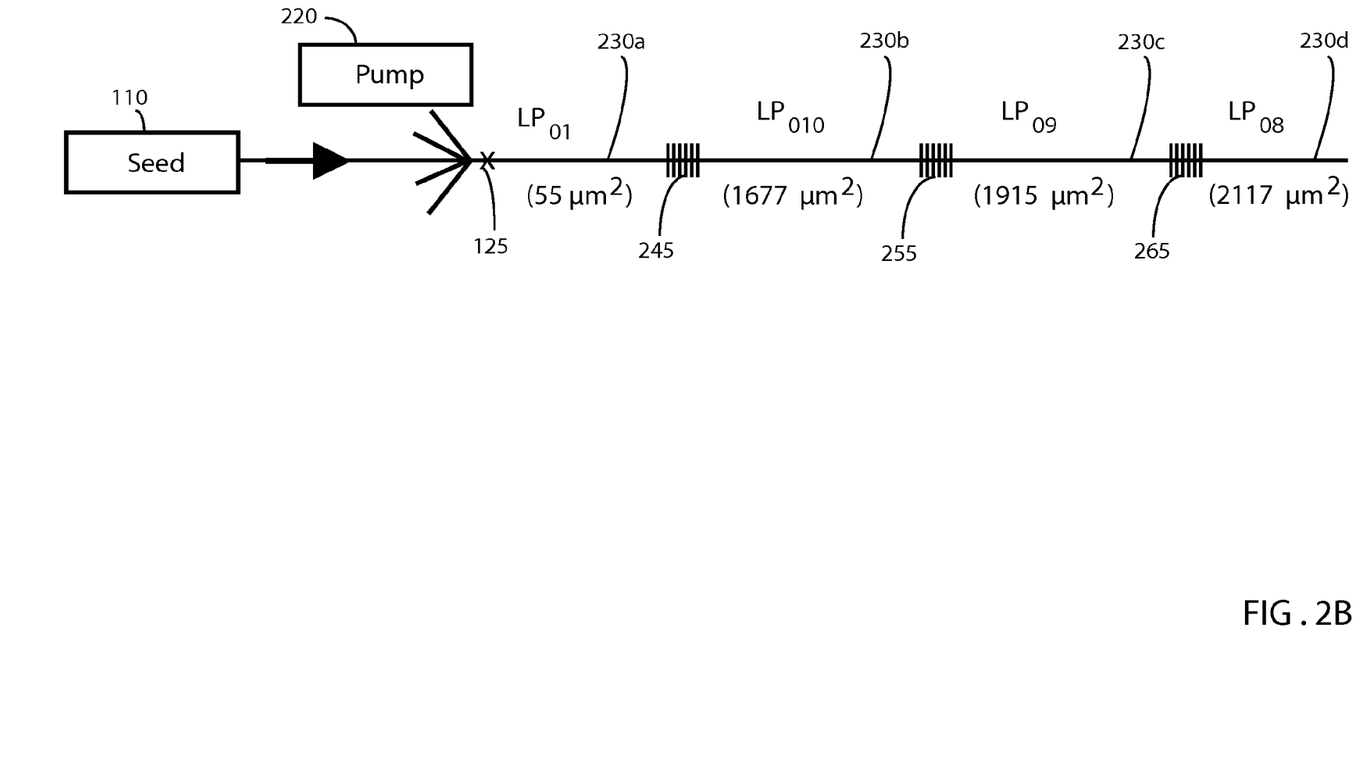
Figure 2C:
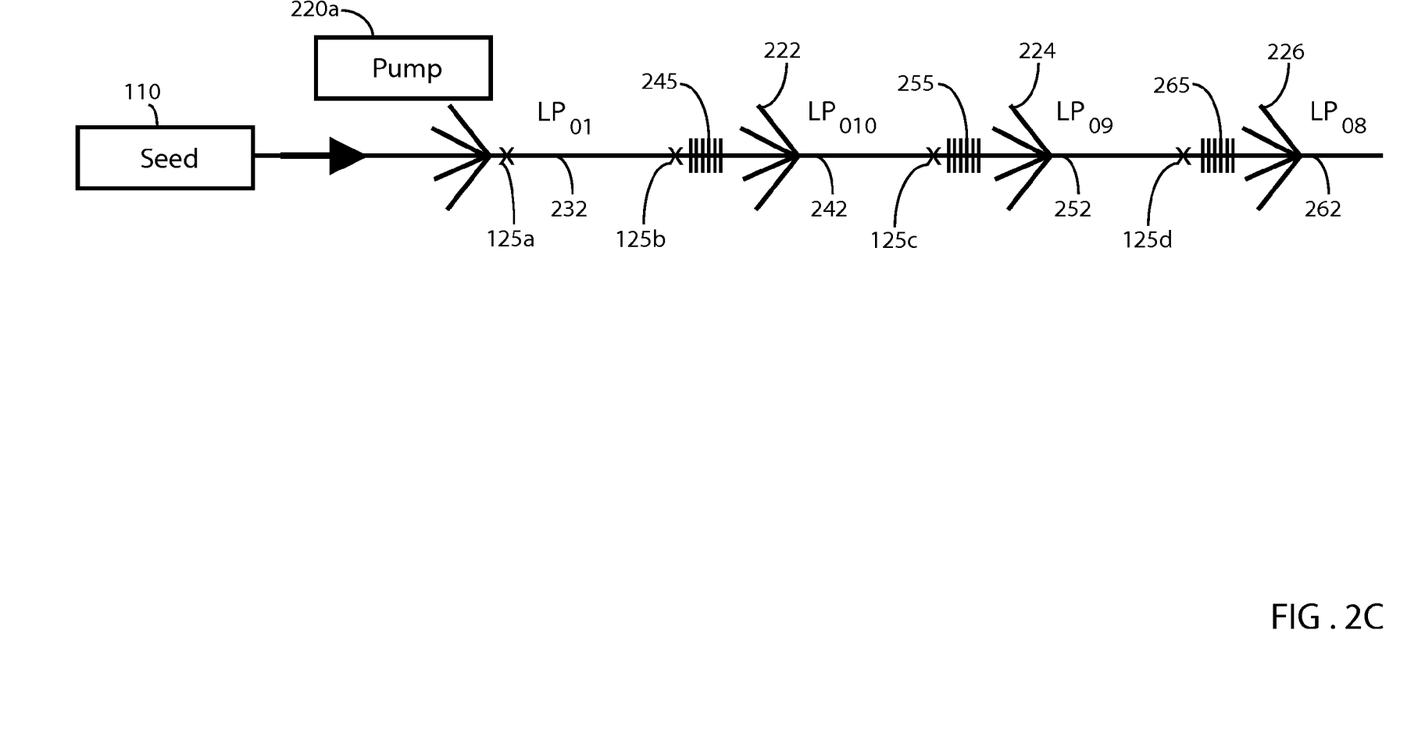

FIGS. 2A through 2C are schematics showing multi-stage architectures in which a propagating signal is converted from one higher-order mode (HOM) to another HOM.

FIG. 2A shows one embodiment where the incoming signal 115 is injected into a first gain-doped fiber segment 230, which has been spliced 125a to the input fiber. Using a long-period gratings (LPG) 225, the incoming fundamental mode signal ($LP_{01}$) is converted into a HOM signal $LP_{nm}$ (where m>1) and propagated along the gain-doped fiber segment 230. The conversion of the $LP_{01}$ signal to a HOM signal results in an increase in the effective mode area of the gain fiber segment 230, thereby reducing undesired nonlinear effects. In the particular embodiment of FIG. 2A, the same $LP_{nm}$ signal is propagated along different gain-doped fiber segments 240, 250, 260.

In another embodiment, shown in FIG. 2B, the input fiber segment is spliced 125 to a gain-doped fiber 230a. Rather than splicing different fiber segments, as in the embodiment of FIG. 2A, the signal is propagated along the same fiber 230, but the effective mode area of the fiber is sequentially changed to accommodate the increasing power levels. Thus, in operation, the $LP_{01}$ signal with a relatively low effective area (e.g., 55 square micrometers) propagates along the first segment 230a. When the signal power has increased to a certain point, LPG 245 converts the fundamental signal ($LP_{01}$) to a HOM ($LP_{010}$) signal, which has a larger effective mode area (e.g., 1677 square microns). The increased cross-sectional area increases the saturation energy and correspondingly increases the efficiency of energy extraction. In short, the mode area of the second segment 230b is matched to the signal power for that second segment 230b.

As the power level of the signal increases with the propagation of the signal, the $LP_{010}$ signal is converted to a different HOM signal ($LP_{09}$), which has an even greater effective mode area (e.g., 1915 square microns) by another LPG 255. Again, the increased effective area in that fiber segment 230c matches the signal power within that fiber segment 230c. As illustrated in FIG. 2B, the mode area of the fiber at the signal launch end 110 can be relatively small (e.g., 55 square microns) and increased along the fiber using a cascade of modes. Thus, the $LP_{01}$ signal, which is launched into the fiber, is converted into a HOM signal with an intermediate effective mode area at some point. The cascade continues to increase the effective mode area, thereby mitigating the detrimental effects that are normally associated with high intensity or power.

Figure 3:
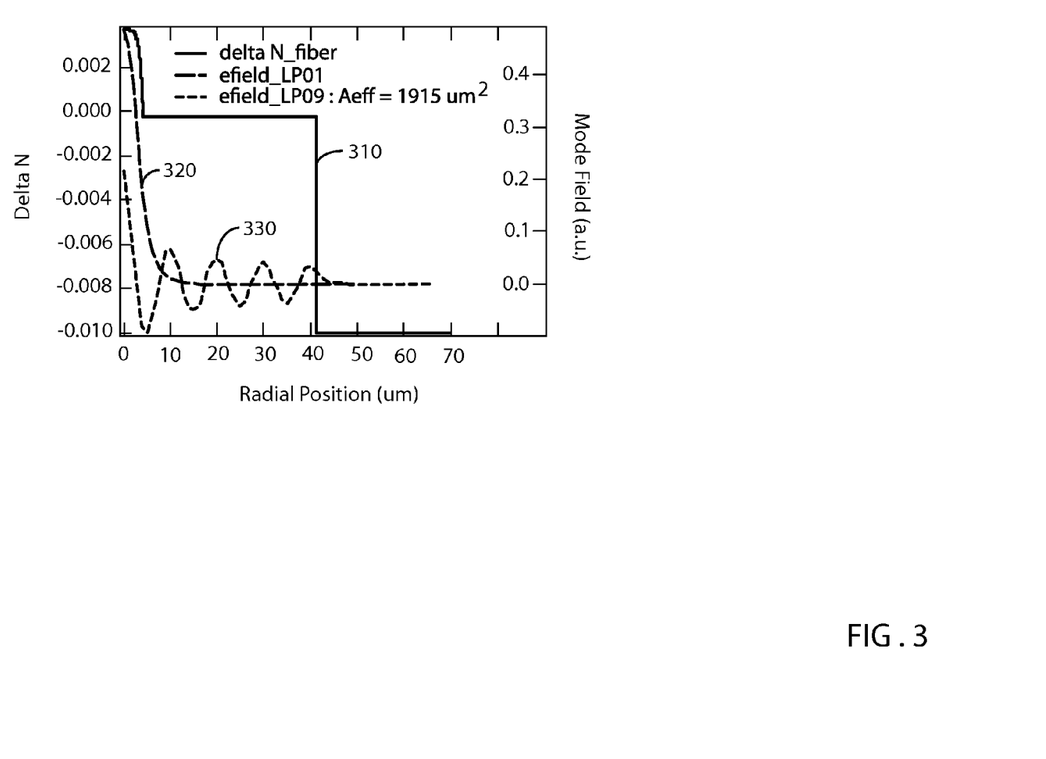
FIG. 3 is a chart showing an example profile illustrating the difference in effective area between two different modes.

FIG. 3 shows that, while the effective area of the $LP_{01}$ (fundamental mode) signal 320 substantially corresponds to the core of the fiber (shown in the profile 310), the higher-order $LP_{09}$ mode signal 330 resides in both the core and the surrounding cladding layer. As one can see, the $LP_{09}$ HOM manifests a larger effective mode area than the $LP_{01}$ fundamental mode.

As shown in FIG. 2C, the embodiments of FIG. 2A and FIG. 2B can be combined. In other words, rather than propagating one HOM signal through different fiber segments (as in FIG. 2A) or propagating different HOM signals through the same fiber (as in FIG. 2B), one can splice together multiple fiber segments 232, 242, 252, 262 and convert the signal to different modes (e.g., $LP_{010}$, $LP_{09}$, $LP_{08}$, etc.) as it propagates through its corresponding fiber segment. By way of example, as shown in TABLE 1, below, the signal can be converted sequentially to greater-and-greater effective mode areas.

TABLE 1

| Mode Effective Area (in square micrometers) | Mode Order |
|---|---|
| 55 | $LP_{01}$ |
| 1677.79 | $LP_{010}$ |
| 1915.27 | $LP_{09}$ |
| 2117.26 | $LP_{08}$ |
| 2994.1 | $LP_{03}$ |
| 3451.72 | $LP_{02}$ |

As one can imagine, many permutations exist for cascading HOM signals through multiple fiber stages.

The length of the fiber for each segment, and the increase in effective area in the following stage, can be balanced. For example, if the gain section provides 3 dB of gain before the next segment, then the area may correspondingly be increased by 3 dB in that next segment. In some cases, the nonlinear impairment does not scale directly with different effective areas, so other area increments can be chosen. By way of example, stimulated Brillouin scattering depends on the acoustic properties of the fiber. In some cases, the nonlinear threshold scales sub-linearly with effective area. In other cases, where the threshold depends on the cross-coupling between modes, the threshold scales super-linearly. For these types of situations, a simple linear scaling would be sub-optimal.

Cascades of A-B mode converters can have low throughput loss and high extinction if the spatial overlap of the A and B modes is sufficiently high and the resonant coupling is sufficiently strong. Since effective $LP_{01}$ to $LP_{09}$ mode coupling is expected for ultra-violet (UV) written gratings in the fiber, whose index profile is shown in FIG. 3, this is evidence that, in general, the spatial overlap does not have to be large.

Also, in the examples shown herein, even though only the central core may be photosensitive, there is sufficient index modulation to provide resonant coupling. In some cases, the spatial extent of photosensitivity may be controlled within the core and/or cladding to control mode coupling. Different photosensitive materials may be used to further increase mode coupler flexibility. For example, one region of the fiber can be doped with Germanium (Ge) while another region of the fiber is doped with Phosphorous (P). Gratings can be written in the Ge region using 248 nanometer (nm) exposure while the P region responds to the 193 nm exposure.

In addition to increasing the effective area of the signal along the length of the fiber, the mode converters (MC) provide useful filtering. For example, since stimulated Brillouin scattering (SBS) occurs when the optical field excites an acoustic response by electrostriction, the acoustic modes are determined by the specific optical mode pattern. By varying the mode pattern along the fiber, growth of SBS is disrupted, thereby significantly increasing the SBS threshold.

Other undesired effects, like growth of amplified spontaneous emissions (ASE) and Raman scattering may occur outside of the MC bandwidth and pass through without conversion. This may be advantageous since the unwanted light propagates in a different mode than the signal and may be rejected at the final exit MC. However, it may also be detrimental since the other modes will retain the smaller effective area from the preceding segment and, thus, have a lower nonlinear threshold. For example, in FIG. 2B, the ASE in the $LP_{01}$ mode originating from the first segment will propagate through the entire fiber length, competing with the signal mode.

Also, these other modes will reside in different spatial regions of the fiber and could extract gain from local areas where the signal power is low, such as at the nulls in the intensity pattern. In such cases, known methods may be used to reject this light, such as the use of Bragg gratings.

Figure 4:
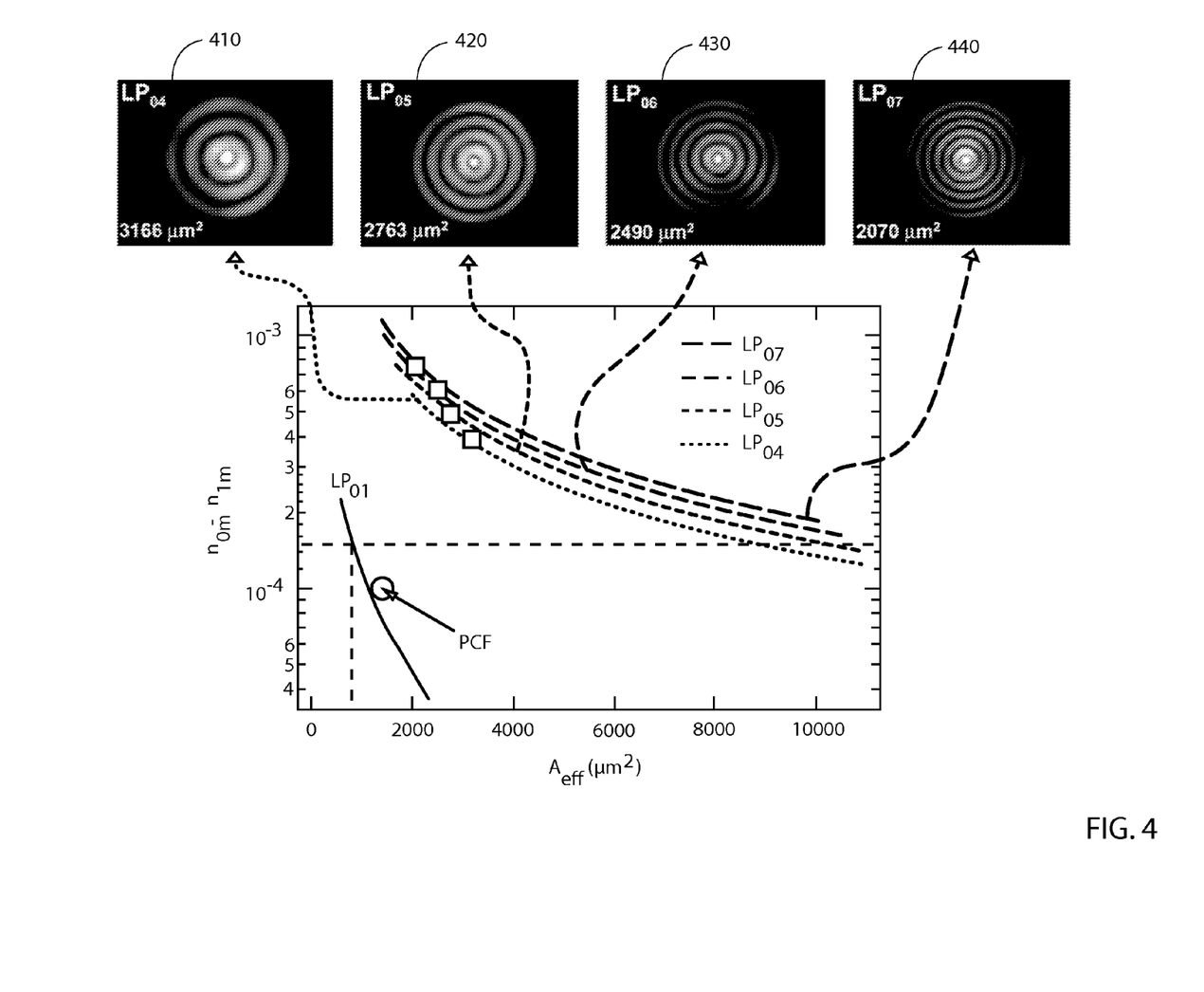
FIG. 4 is a chart showing a correlation between mode stability and choice of mode order.

FIG. 4 is a chart showing a correlation between mode stability and choice of mode order. The line designated as $LP_{01}$ illustrates the trade-off between stability and effective areas for the $LP_{01}$ mode of fibers. Generally, robust operation with conventional LMA fibers is limited to effective areas of approximately 800 square micrometers, since larger effective areas yield low enough $n_{01}$-$n_{11}$ values so that mode coupling becomes prohibitively high. In FIG. 4, the threshold for high mode coupling, for the 800 square-micrometer LMA fiber, is shown by the horizontal dashed line. Also depicted is a data point denoted "MOF," which illustrates the largest effective areas (approximately 1400 square micrometers) for micro-structured optical fibers as of 2005. Micro-structured optical fibers can be designed with large differential modal losses, which enables radiating out the $LP_{11}$ mode, thereby yielding higher modal purity at the output. Hence, these fibers can offer stable operation for cases with significantly lower $n_{01}$-$n_{11}$.

As shown in FIG. 4, HOMs permit substantial scaling of effective areas. While the stability (represented by $n_{0m}$-$n_{1m}$) of the HOMs ($LP_{04}$, $LP_{05}$, $LP_{06}$, and $LP_{07}$) degrades with an increase in effective area, the degree of degradation is significantly less than the degradation exhibited in the fundamental mode. Specifically, the $n_{0m}$-$n_{1m}$ values for the HOMs are an order of magnitude higher than those for the fundamental mode ($LP_{01}$). As such, the behavior of the HOMs evidence an ability of the HOMs to obtain stable, mode-mixing-free signal propagation with significantly larger effective areas than that which is achievable in the fundamental mode. Additionally, the $n_{0m}$-$n_{1m}$ values increase with modal order (denoted by the subscript "m"), indicating that this concept is substantially scalable.

FIG. 4 also shows experimentally-recorded near-field images for the modes $LP_{04}$ 410, $LP_{05}$ 420, $LP_{06}$ 430, and $LP_{07}$ 440. In the particular embodiment shown in FIG. 4, the $LP_{04}$ mode has an effective area of approximately 3200 square micrometers; the $LP_{05}$ mode has an effective area of approximately 2800 square micrometers; the $LP_{06}$ mode has an effective area of approximately 2500 square micrometers; and the $LP_{07}$ mode has an effective area of approximately 2100 square micrometers.

Figure 5:
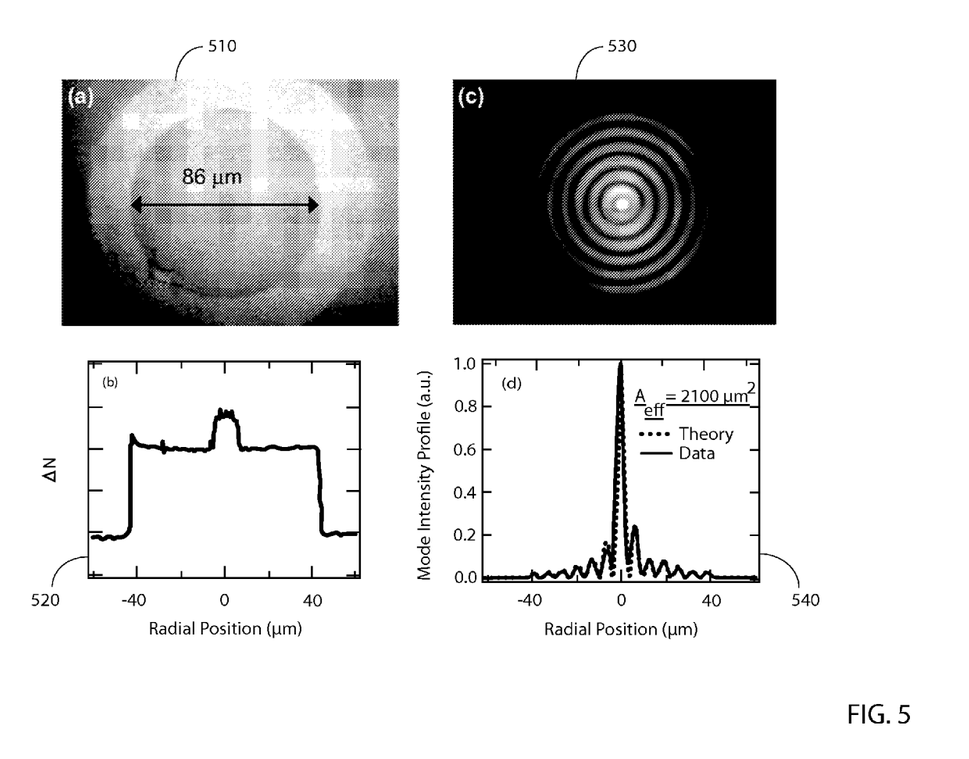

FIG. 5 shows details of a few-moded fiber that was used to obtain the modal images of FIG. 4. Specifically, FIG. 5(a) is a near-field image showing a cross-section of an example fiber having an 86-micrometer-diameter inner cladding, FIG. 5(b) is a chart showing the refractive index profile of the fiber in FIG. 5(a), and FIG. 5(c) is a diagram showing a near-field image of the $LP_{07}$ signal that propagates along the fiber of FIG. 5(a). The inner cladding, as shown in FIGS. 5(a) and 5(b), is where the HOM of FIG. 5(c) resides. FIG. 5(d) is a chart comparing the actual signal profile of FIG. 5(c) with a theoretical signal profile. The intensity line-scan of the actual signal, shown in FIG. 5(d), matches quite well with the theoretical value. The mode-intensity profiles are used to calculate the effective area of the mode, yielding, for this particular embodiment, 2140 square micrometers for the simulation, and 2075 square micrometers for the actual experimental value. Transmission in HOMs have shown stable propagation along fiber lengths that exceed 50 meters, with bend radii less than 4.5 centimeters. An example of such bend insensitivity is shown in FIGS. 6(a) and 6(b), which demonstrates that signal integrity is maintained at bend radii of approximately 7 centimeters (R1) and approximately 4.5 centimeters (R2), but shows slight distortions due to undesired coupling at a bend radius of approximately 3.8 centimeters.

The desired HOM signal is excited from a fundamental-mode signal by a mode converter or a LPG, such as that shown in the drawings above. The signal is coupled into the single-mode-fiber (SMF) like core of the HOM fiber, such as that shown in FIG. 5(b). This coupling can be achieved with high modal purity and low loss using conventional splicing techniques. The incoming signal is converted to the desired $LP_{0m}$ mode using the LPG. Since LPGs are periodic index perturbations in the fiber, the resonant nature of the LPGs effectively couples the incoming signal to the higher-order mode. As such, when the LPG is designed to match the beat length for coupling between two co-propagating modes in a fiber, a highly efficient coupling occurs from one mode to the other. Because LPGs are reciprocal devices, the HOM signal can be converted back to the fundamental mode with an LPG that has the same structure as that which was used to convert the fundamental mode signal to the HOM signal.

Although exemplary embodiments have been shown and described, it will be clear to those of ordinary skill in the art that a number of changes, modifications, or alterations to the disclosure as described may be made. For example, while specific HOMs have been shown in the drawings and described in detail, it should be appreciated that other mode orders (in addition to those that are expressly shown) can be used to accommodate various other design parameters. All such changes, modifications, and alterations should therefore be seen as within the scope of the disclosure.

What is claimed is:

1. An apparatus comprising:
   a first segment of optical fiber for propagating a first higher-order mode (HOM) signal;
   a mode converter optically coupled to the first segment of optical fiber, the mode converter for converting the first HOM signal to a second HOM signal; and
   a second segment of optical fiber optically coupled to the mode converter, the second segment of optical fiber for propagating the second HOM signal.

2. The apparatus of claim 1, the first segment of optical fiber being gain doped, and the second segment of optical fiber being gain doped.

3. The apparatus of claim 1, the first segment of optical fiber being the same as the second segment of optical fiber.

4. The apparatus of claim 1, the first segment of optical fiber being different from the second segment of optical fiber.

5. The apparatus of claim 1, the first HOM signal having a first effective mode area, the second HOM signal having a second effective mode area, the second effective mode area being larger than the first effective mode area.

6. The apparatus of claim 1, the mode converter being a long-period grating (LPG).

7. The apparatus of claim 6, the LPG being written onto the first segment of optical fiber.

8. The apparatus of claim 6, the LPG being written onto the second segment of optical fiber.

9. The apparatus of claim 1, the mode converter being an integrated component of the first segment of optical fiber.

10. The apparatus of claim 1, the mode converter being an integrated component of the second segment of optical fiber.

11. The apparatus of claim 1, further comprising:
    a second mode converter for converting the second HOM signal to a third HOM signal, the third HOM signal having a larger effective mode area than the second HOM signal; and
    a third segment of optical fiber for propagating a third HOM signal.

12. An apparatus comprising:
a first segment of gain-doped optical fiber for propagating a first higher-order mode (HOM) signal;
a mode converter optically coupled to the first segment, the mode converter for converting the first HOM signal to a second HOM signal; and
a second segment of gain-doped optical fiber optically coupled to the mode converter, the second segment for propagating the second HOM signal.

* * * * *